(No Model.)
L. A. ERICKSON.
BICYCLE RIM AND TIRE.
No. 532,950. Patented Jan. 22, 1895.
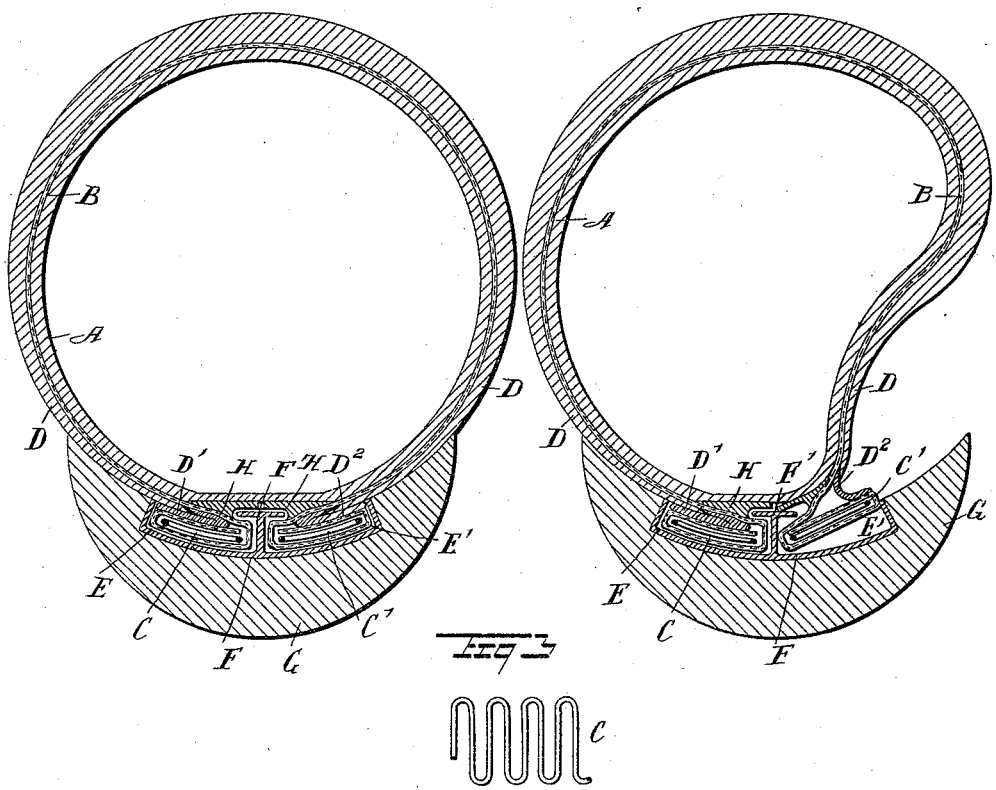
WITNESSES:
H. Walker
INVENTOR
L. A. Erickson
BY
Munn & Co.
ATTORNEYS.

UNITED STATES PATENT OFFICE.

LEWIS A. ERICKSON, OF STROMSBURG, NEBRASKA.

BICYCLE RIM AND TIRE.

SPECIFICATION forming part of Letters Patent No. 532,950, dated January 22, 1895.

Application filed September 7, 1894. Serial No. 522,374. (No model.)

*To all whom it may concern:*

Be it known that I, LEWIS A. ERICKSON, of Stromsburg, in the county of Polk and State of Nebraska, have invented a new and Improved Bicycle Rim and Tire, of which the following is a full, clear, and exact description.

The object of the invention is to provide a new and improved bicycle rim and tire, which is simple and durable in construction and arranged to mechanically unite the pneumatic tire with the rim, and to permit of using the wheel whether the tire is inflated or deflated.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a cross section of the improvement. Fig. 2 is a similar view of the same, with one of the projections detached; and Fig. 3 is a plan view of the spring in the projection.

The improved bicycle wheel is provided with the usual separate rubber air tube A, surrounded by a strip of canvas B vulcanized or otherwise attached to the exterior rubber tube D. The loose ends of the canvas B are folded around wire springs C, C', as is plainly illustrated in Figs. 1 and 2, so as to form projections on the bottom of the pneumatic tire, the said projections being connected with the strips D' and D² of thin canvas, or muslin vulcanized to the tube B and projections. The projections thus formed on the bottom of the tire, fit into recesses E and E' arranged in a metallic band or casing F inserted in the top of the rim G made of wood, metal or any other suitable material. The metallic band F is preferably made U-shaped in cross section, and formed in its middle with an annular rib or ridge F' made T-shaped, so as to separate the recesses E and E' from each other, while at the same time the horizontal head of the rib F' forms an abutment for the inner ends of the projections to securely hold and mechanically fasten the tire to the rim. In order to protect that portion of the rubber air tube A, directly located above the said rib or ridge F', I provide strips of rubber H, vulcanized or otherwise attached to the ends of the canvas B, so that the adjacent ends of the said strips H rest on the top of the head of the rib or ridge F'.

It will be seen that by the construction described, the projections formed by the ends of the canvas, the springs and the ends D' and D² of the rubber tube D, can be readily inserted in or removed from the recesses E and E' in the band or casing F.

It will further be seen that when the air tube A is inflated and the projections are engaged in the said recesses, then the tire is firmly united on the rim, and is not liable to be accidentally displaced when the bicycle is in use.

It will further be seen that when the tire is fastened to the rim, if the said tire should become deflated accidentally, then the said tire is not liable to become detached from the rim as the projections securely hold the tire in place on the rim.

I do not limit myself to the springs C and C' for forming a stiffening for the projections, as strips of sheet metal or other suitable material may be employed to accomplish the same purpose.

Having thus fully described my invention, I claim as new and desire to secure by Letters Patent—

1. A bicycle tire consisting in the air tube A, the exterior rubber tube D having a canvas strip B secured to its interior and projecting at its longitudinal edges beyond the edges of the tube D and there folded and provided with stiffening devices forming the parallel locking projections, fabric strips D' D² vulcanized at one edge to the outer edges of the said locking projections and similarly secured at their inner edges between the edges of the outer tube D and the strip B, and the rubber strips H secured at their outer edges to the inner sides of the strip B and projecting inwardly over the inner halves of the said locking projections and spaced therefrom, substantially as described.

2. The combination with the U-shaped metallic band provided with a central T-shaped annular rib F' forming recesses E E', of the tire provided with the canvas strip B having its edges folded and provided with stiffening
5 devices in the folds forming projections to fit the recesses E E', the strengthening strips D' D² in the outer angles of said projections, and the protecting ribs H H extending inwardly over the head of the T-shaped rib F', and protecting the inner tube of the tire therefrom, 10 substantially as described.

LEWIS A. ERICKSON.

Witnesses:
 W. O. JOHNSON,
 H. E. JOHNSON.